(12) United States Patent
Wu et al.

(10) Patent No.: US 12,406,783 B2
(45) Date of Patent: Sep. 2, 2025

(54) CIRCUIT PROTECTION DEVICE

(71) Applicant: Polytronics Technology Corp., Hsinchu (TW)

(72) Inventors: Chien Hui Wu, Zhudong Township (TW); Yung-Hsien Chang, Douliu (TW); Cheng-Yu Tung, Tainan (TW); Ming-Hsun Lu, Taoyuan (TW); Yi-An Sha, Xindian (TW)

(73) Assignee: POLYTRONICS TECHNOLOGY CORP., Hsinchu (TW)

( * ) Notice: Subject to any disclaimer, the term of this patent is extended or adjusted under 35 U.S.C. 154(b) by 372 days.

(21) Appl. No.: 18/154,599

(22) Filed: Jan. 13, 2023

(65) Prior Publication Data
US 2024/0071656 A1    Feb. 29, 2024

(30) Foreign Application Priority Data
Aug. 24, 2022   (TW) .................................. 111131804

(51) Int. Cl.
*H01C 7/02*   (2006.01)
*H01C 1/01*   (2006.01)
*H01C 1/14*   (2006.01)

(52) U.S. Cl.
CPC .............. *H01C 7/021* (2013.01); *H01C 1/01* (2013.01); *H01C 1/1406* (2013.01)

(58) Field of Classification Search
CPC ......... H01C 7/021; H01C 1/01; H01C 1/1406
See application file for complete search history.

(56) References Cited

U.S. PATENT DOCUMENTS

| | | | | |
|---|---|---|---|---|
| 6,020,808 A * | 2/2000 | Hogge | .................... | H01C 7/028 338/332 |
| 6,640,420 B1 * | 11/2003 | Hetherton | .............. | H01C 7/021 29/621 |
| 6,809,626 B2 * | 10/2004 | Chu | ......................... | H01C 7/02 337/167 |

(Continued)

FOREIGN PATENT DOCUMENTS

TW          202138445 A       10/2021

*Primary Examiner* — Kyung S Lee
(74) *Attorney, Agent, or Firm* — MUNCY, GEISSLER, OLDS & LOWE, P.C.

(57) ABSTRACT

A circuit protection device includes a first temperature sensitive resistor, a second temperature sensitive resistor, an electrically insulating multilayer, a first and second electrode layer, and at least one external electrode. The first temperature sensitive resistor and the second temperature sensitive resistor are electrically connected in parallel, and have a first upper electrically conductive layer and a second lower electrically conductive layer, respectively. The electrically insulating multilayer includes an upper insulating layer, a middle insulating layer, and a lower insulating layer. The upper insulating layer is between the first upper electrically conductive layer and the first electrode layer. The middle layer is laminated between the first temperature sensitive resistor and the second temperature sensitive resistor. The lower insulating layer is between the second lower electrically conductive layer and the second electrode layer. The external electrode is disposed on the first electrode layer, and extends beyond a peripheral wall along a horizontal direction.

19 Claims, 7 Drawing Sheets

(56) References Cited

U.S. PATENT DOCUMENTS

| | | | |
|---|---|---|---|
| 9,000,881 B2* | 4/2015 | Chu | H01C 1/1406 |
| | | | 338/13 |
| 9,041,507 B2* | 5/2015 | Wang | H01C 7/027 |
| | | | 338/13 |
| 9,142,949 B2* | 9/2015 | Usui | H01C 7/021 |
| 2004/0090304 A1* | 5/2004 | Hetherton | H01C 7/027 |
| | | | 338/320 |
| 2011/0175700 A1* | 7/2011 | Bourns | H01C 17/02 |
| | | | 29/852 |
| 2021/0313097 A1* | 10/2021 | Tsang | H02H 9/026 |
| 2022/0399141 A1* | 12/2022 | Li | H01C 1/148 |
| 2024/0071656 A1* | 2/2024 | Wu | H01C 7/021 |

* cited by examiner

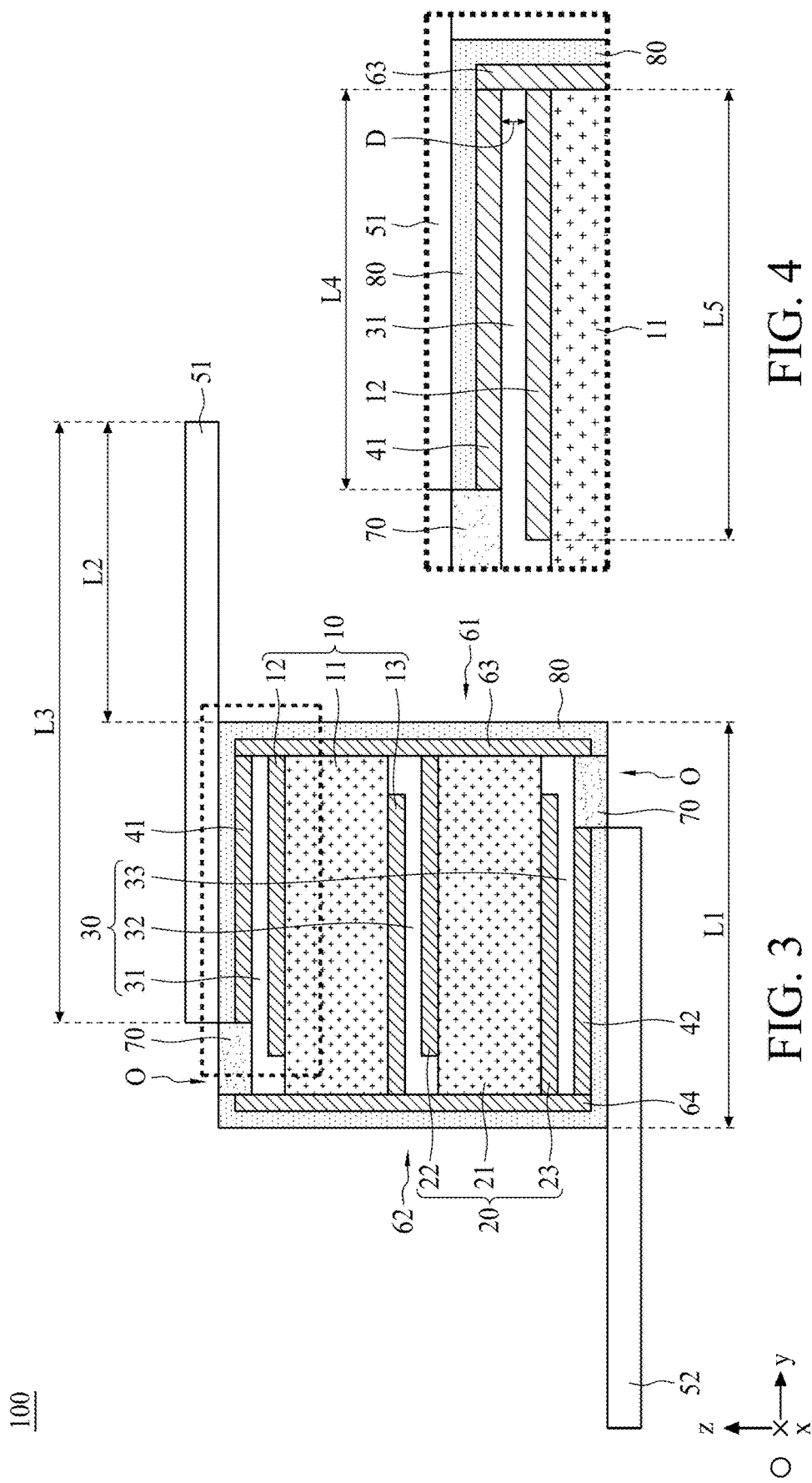

CIRCUIT PROTECTION DEVICE

BACKGROUND OF THE INVENTION (1) Field of the Invention

The present application relates to a circuit protection device, and more specifically, to a thermally stable circuit protection device having temperature sensitive resistors electrically connected in parallel.

(2) Description of the Related Art

Because the electrical resistance of conductive composite materials having a positive temperature coefficient (PTC) characteristic is very sensitive to temperature variation, it can be used as the material for current sensing devices and has been widely applied to over-current protection devices or circuit devices. More specifically, the electrical resistance of the PTC conductive composite material remains extremely low at normal temperatures, so that the circuit or cell can operate normally. However, when an over-current or an over-temperature event occurs in the circuit or cell, the electrical resistance will instantaneously increase to a high electrical resistance state (e.g., at least above $10^4 \Omega$), which is the so-called "trip." Therefore, the over-current will be eliminated so as to protect the cell or the circuit device.

Taking a polymeric PTC material as an example, carbon black is usually used as conductive filler which is evenly dispersed in crystalline polymer. In this crystalline structure, the carbon black particles are usually aligned at grain boundaries and are arranged closely. Accordingly, current can flow through the insulating crystalline polymer through such "carbon black chains." At normal temperatures such as room temperature, numerous carbon chains exist in the polymer, constituting quite a lot of conductive paths. When the current passing through the conductive paths and makes the temperature of device increase to a temperature exceeding the phase transition temperature of the polymer (e.g., the melting point of the polymer), the polymer would expand and these carbon black particles becomes separated from each other. As such, the carbon chains are broken and thus current is not allowed to pass therethrough, and as a consequence, the resistance increases instantaneously. The phenomenon of instant increase of resistance is the so-called "trip."

When the temperature decreases to below the phase transition temperature, the polymer is re-crystallized and the conductive carbon black chains are rebuilt. However, the polymer cannot be fully recovered after expansion so that the carbon chains cannot sustain original conductivity and the resistance cannot return to initial low resistance. After tripping many times, the resistance may increase significantly, resulting in poor resistance recovery or poor resistance repeatability.

More specifically, when tripping, the volume of the PTC polymer changes tremendously, and the coefficient of thermal expansion (CTE) may be over 5000 ppm/K. Accordingly, the PTC material cannot fully return to its original structure owing to the tremendous change in volume, thereby significantly increasing the resistance when cooled back to room temperature. In a surface-mountable PTC device, the electrically conductive layers in physical contact with the PTC material layer are usually metal foils such as nickel foils, copper foils or nickel-plated copper foils. The CTE of the copper foil or nickel-plated copper foil are about 17 ppm/K, and the CTE of the nickel foil is 13 ppm/K, both are much smaller than that of the PTC polymer material. To solve this problem, traditionally, the manufacturers majorly concentrate improvement on structural design of the electrically conductive layers, by which the issue of poor resistance repeatability can be addressed. For example, one improvement is that the electrically conductive layers may be thickened so as to increase the structural strength of the PTC device.

Moreover, it is understood that the development of electronic apparatuses grow fast as time goes on, and the electronic apparatuses to be protected require larger current flow more than ever for the purpose of quick charge and discharge. In this regard, the temperature sensitive resistor (i.e., two electrically conductive layers with one PTC material layer sandwiched therebetween) in a circuit protection device is often designed to have larger size, thereby decreasing the entire resistance as the surface area increases. However, the larger size of the circuit protection device means the larger space it occupies, and thus application of the circuit protection device may be limited as the electronic apparatuses become smaller and smaller. Even though the size of the circuit protection device could be reduced, it may encounter the issue of thermal stability. Heat generated by the circuit protection device easily accumulates, leading to a consequence that the circuit protection device has a low hold current ($I_{hold}$). In some cases, the circuit protection device even expands and causes thermal stress after tripping, which may lead to the issue of poor resistance recovery or poor resistance repeatability. Therefore, application of the circuit protection device may also be limited owing to the thermal stability described above.

Apparently, miniaturization becomes the trend for the circuit protection device but it encounters lots of issues as described above. Accordingly, there is a need to improve the circuit protection device to solve the issues regarding resistance recovery, electrical resistance, and thermal stability.

SUMMARY OF THE INVENTION

The present invention provides a circuit protection device with at least two temperature sensitive resistors. The temperature sensitive resistors are connected to each other in parallel, and therefore the circuit protection device may have lower electrical resistance so that the current flow is increased. In other words, the aforementioned parallel circuit allows the size of the circuit protection device to be reduced while maintaining low electrical resistance. However, electrical and structural characteristics of the circuit protection device are easily influenced by heat due to the reduction in size and/or the increase of current flow. As the issues of parallel temperature sensitive resistors described above, the present invention further adjusts the design of various components so as to improve the thermal stability of the circuit protection device. First, an upper insulating layer and a lower insulating layer are disposed below a top internal electrode (also called first electrode layer hereinafter) and above a bottom internal electrode (also called second electrode layer hereinafter), respectively. Both the upper insulating layer and the lower insulating layer have thermal expansion coefficients lower than that of a positive temperature coefficient (PTC) layer of the circuit protection device, by which structural strength of the circuit protection device is increased. In this way, the issue of poor resistance recovery incurred by thermal expansion can be solved. Second, at least one external electrode is provided. Its surface area, position to be placed, and length to be extended are taken into consideration and adjusted accordingly, by which heat dissipation is enhanced and hold current ($I_{hold}$) of the circuit protection device may also be increased. Third, a plurality of notches are provided on one side of the circuit protection device, and stresses of thermal expansion are mitigated. Fourth, the circuit protection device is packaged with an insulation material, by which environment factors can be blocked and the entire structure of the circuit protection device may be further stabilized.

In accordance with an aspect of the present invention, a circuit protection device has an upper surface, a lower surface opposite to the upper surface, and a peripheral wall connected between the upper surface and the lower surface. The circuit protection device includes a first temperature sensitive resistor, a second temperature sensitive resistor, an electrically insulating multilayer, a first electrode layer and a second electrode layer, and a first external electrode. The first temperature sensitive resistor includes a first upper electrically conductive layer, a first lower electrically conductive layer, and a first positive temperature coefficient (PTC) layer laminated between the first upper electrically conductive layer and the first lower electrically conductive layer. The second temperature sensitive resistor includes a second upper electrically conductive layer, a second lower electrically conductive layer, and a second PTC layer laminated between the second upper electrically conductive layer and the second lower electrically conductive layer. The electrically insulating multilayer has an upper insulating layer, a middle insulating layer, and a lower insulating layer. The upper insulating layer extends beyond the first upper electrically conductive layer, by which the first upper electrically conductive layer is entirely covered and the first PTC layer is partially covered by the upper insulating layer. The middle insulating layer is laminated between the first lower electrically conductive layer and the second upper electrically conductive layer, thereby bonding the first temperature sensitive resistor to the second temperature sensitive resistor. The lower insulating layer extends beyond the second lower electrically conductive layer, by which the second lower electrically conductive layer is entirely covered and the second PTC layer is partially covered by the lower insulating layer. The first electrode layer and the second electrode layer are attached to the upper insulating layer and the lower insulating layer, respectively. The first electrode layer is electrically connected to the first upper electrically conductive layer and the second upper electrically conductive layer, and the second electrode layer is electrically connected to the first lower electrically conductive layer and the second lower electrically conductive layer. The first external electrode is disposed on the first electrode layer, and extends beyond the peripheral wall along a first horizontal direction parallel to the first electrode layer.

In an embodiment, the circuit protection device further includes a right notch and a left notch. The upper insulating layer is attached between the first electrode layer and the first upper electrically conductive layer so as to space the first electrode layer apart from the first upper electrically conductive layer by a distance. The first electrode layer and the first upper electrically conductive layer are parallel to each other, and extend to the right notch, thereby electrically connecting to each other through the right notch.

In an embodiment, the distance ranges from 0.02 mm to 0.06 mm.

In an embodiment, an opening is formed on the first electrode layer, and is positioned directly above where the first PTC layer is partially covered by the upper insulating layer, by which the first electrode layer does not extend to the left notch and has no electrical connection to the left notch.

In an embodiment, the circuit protection device further includes an electrically insulating material. The electrically insulating material is filled in the opening.

In an embodiment, the right notch has a right electrically conductive member electrically connecting to the first electrode layer, the first upper electrically conductive layer, and the second upper electrically conductive layer. The left notch has a left electrically conductive member electrically connecting to the second electrode layer, the first lower electrically conductive layer, and the second lower electrically conductive layer.

In an embodiment, the circuit protection device further includes a structural reinforcing metal film. The structural reinforcing metal film covers a surface of the first electrode layer, a surface of the second electrode layer, a surface of the right electrically conductive member, and a surface of the left electrically conductive member, by which the first electrode layer, the second electrode layer, the right electrically conductive member, and the left electrically conductive member are insulated from environmental air.

In an embodiment, the peripheral wall has a left sidewall, a right sidewall opposite to the left sidewall, a front sidewall, and a rear sidewall opposite to the front sidewall. The left notch is disposed on the left sidewall, and the right notch is disposed on the right sidewall.

In an embodiment, the first external electrode extends beyond the right sidewall along the first horizontal direction.

In an embodiment, the circuit protection device has a first length parallel to the first horizontal direction, and the first external electrode has a second length from and beyond the right sidewall. If the sum of the first length and the second length is calculated as 100%, the second length accounts for 31% to 53%.

In an embodiment, the second length ranges from 4 mm to 8 mm.

In an embodiment, the upper surface of the circuit protection device has a first upper surface area, an upper surface of the first external electrode has a second upper surface area, and a value by dividing the second upper surface area by the first upper surface area ranges from 1.37 to 1.64.

In an embodiment, the circuit protection device further includes a second external electrode disposed on the second electrode layer covered by the structural reinforcing metal film. The first external electrode extends along a second horizontal direction parallel to the first electrode layer and beyond the front sidewall. The second external electrode extends parallel to the first external electrode and beyond the rear sidewall.

In an embodiment, the circuit protection device further includes a second external electrode disposed on the second electrode layer covered by the structural reinforcing metal film. The second external electrode extends opposite to the first horizontal direction and beyond the left sidewall.

In an embodiment, the circuit protection device further includes a packaging tape. The packaging tape wraps around the circuit protection device so as to cover the upper surface, the front sidewall, the lower surface, and the rear sidewall, by which only the right sidewall, the left sidewall, a part of the first external electrode, and a part of the second external electrode of the circuit protection device are exposed.

In an embodiment, the circuit protection device further includes an electrically insulating frame. The electrically insulating frame encapsulates the circuit protection device, and only exposes a part of the first external electrode and a part of the second external electrode.

In an embodiment, the circuit protection device further includes a plurality of right notches and a plurality of left notches opposite to the plurality of right notches. The plurality of right notches are disposed on a right sidewall and the plurality of left notches are disposed on a left sidewall of the peripheral wall, respectively, and the first external electrode extends beyond the right sidewall along the first horizontal direction.

In an embodiment, the circuit protection device further includes a second external electrode disposed on the second electrode layer. The second external electrode extends opposite to the first horizontal direction parallel to the second electrode layer, and extends beyond the left sidewall.

In an embodiment, the circuit protection device further includes a packaging tape. The packaging tape wraps around the circuit protection device, by which only the right sidewall, the left sidewall, a part of the first external electrode, and a part of the second external electrode of the circuit protection device are exposed.

In an embodiment, the circuit protection device further includes an electrically insulating frame. The electrically insulating frame encapsulates the circuit protection device, and only exposes a part of the first external electrode and a part of the second external electrode.

BRIEF DESCRIPTION OF THE DRAWINGS

The present application will be described according to the appended drawings in which:

FIG. 3 shows a cross-sectional view of the circuit protection device shown in FIG. 1;

FIG. 4 shows an enlarged view of a part of the circuit protection device shown in FIG. 3;

DETAILED DESCRIPTION OF THE INVENTION

The making and using of the presently preferred illustrative embodiments are discussed in detail below. It should be appreciated, however, that the present application provides many applicable inventive concepts that can be embodied in a wide variety of specific contexts. The specific illustrative embodiments discussed are merely illustrative of specific ways to make and use the invention, and do not limit the scope of the invention.

Figure 1:
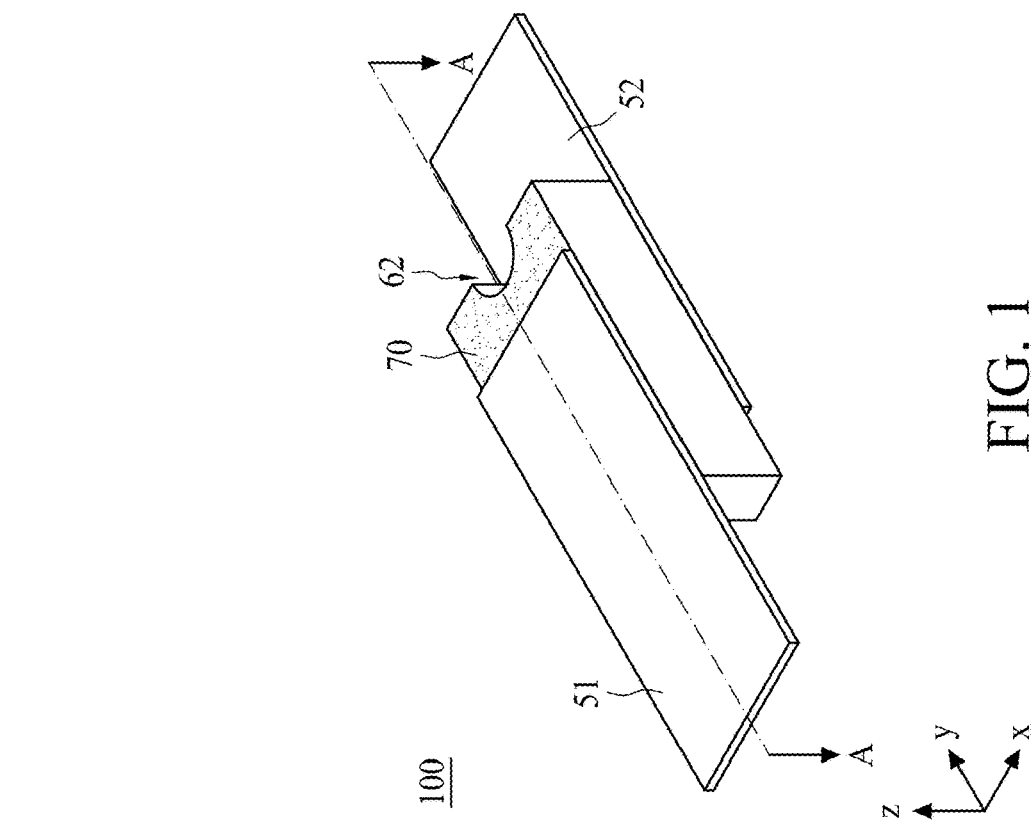
FIG. 1 shows a three-dimensional view of a circuit protection device in accordance with a first aspect of the present invention.

Please refer to FIG. 1 to FIG. 5, in which a first aspect of the present invention is illustrated in three-dimensional view, cross-sectional view, enlarged view, and top view. In FIG. 1, a circuit protection device 100 has a PTC chip as its core structure. The PTC chip has a left notch 62 and a right notch 61. A first external electrode 51 is disposed on an upper surface 101 of the circuit protection device 100, and a second external electrode 52 is disposed on a lower surface 102 of the circuit protection device 100. For ease of understanding and discussion, the first external electrode 51 and the second external electrode 52 are detached from the PTC chip in FIG. 2. In addition, x-axis, y-axis, and z-axis in the figure show orientation in space, and therefore the present invention can be fully discussed in different views. The circuit protection device 100 has an upper surface 101, a lower surface 102 opposite to the upper surface 101, and a peripheral wall 103 connected between the upper surface 101 and the lower surface 102. The peripheral wall 103 has a left sidewall S2, a right sidewall S1, a front sidewall S4, and a rear sidewall S3. The left sidewall S2 is opposite to the right sidewall S1, and the front sidewall S4 is opposite to the rear sidewall S3. The left notch 62 is disposed on the left sidewall S2, and the right notch 61 is disposed on the right sidewall S1. The upper surface 101, the lower surface 102, the left notch 62, and the right notch 61 are covered by a structural reinforcing metal film 80 in order to increase structural strength while preventing the electrode layer (first electrode layer 41 and second electrode layer 42) and conductive member (right electrically conductive member 63 and left electrically conductive member 64) from oxidation. The structural reinforcing metal film 80 may be tin foil, nickel foil, nickel plated copper foil, or the like, which can be formed by sputtering or electroplating.

Please refer to FIG. 3, a cross-sectional view is obtained by taking along the dashed line AA in FIG. 1. The circuit protection device 100 includes a first temperature sensitive resistor 10, a second temperature sensitive resistor 20, an electrically insulating multilayer 30, a first electrode layer 41, a second electrode layer 42, the left notch 62, the right notch 61, and at least one external electrode (e.g., first external electrode 51 and/or second external electrode 52). The first electrode layer 41 is electrically connected to the first temperature sensitive resistor 10 and the second temperature sensitive resistor 20 through the right notch 61. The second electrode layer 42 is electrically connected to the first temperature sensitive resistor 10 and the second temperature sensitive resistor 20 through the left notch 62. The first electrode layer 41 and the second electrode layer 42 may be referred to as internal electrodes of the circuit protection device 100. In an embodiment, the circuit protection device 100 may not include the external electrodes 51, 52 and may be manufactured as surface-mountable type device (SMD) that can be directly welded to circuit board. The first temperature sensitive resistor 10 includes a first upper electrically conductive layer 12, a first lower electrically conductive layer 13, and a first positive temperature coefficient (PTC) layer 11 laminated between the first upper electrically conductive layer 12 and the first lower electrically conductive layer 13. The second temperature sensitive resistor 20 includes a second upper electrically conductive layer 22, a second lower electrically conductive layer 23, and a second PTC layer 21 laminated between the second upper electrically conductive layer 22 and the second lower electrically conductive layer 23. Moreover, the circuit protection device 100 has a first length L1, and the external electrode (e.g., the first external electrode 51) has a second length L2 extending from and beyond the peripheral wall 103, and the total length of the external electrode is referred to as a third length L3. It is noted that the circuit protection device 100 includes at least two temperature sensitive resistors (i.e., the first temperature sensitive resistor 10 and the second temperature sensitive resistor 20) having PTC layers therein, and the temperature sensitive resistors are connected to each other in parallel. Compared with the conventional circuit protection device of the same size and having only one temperature sensitive resistor, the circuit protection device 100 significantly increases the surface area of the electrode layer and correspondingly decreases the electrical resistance owing to the parallel connection between the temperature sensitive resistors. In other words, the circuit protection device 100 may have lower electrical resistance so that the current flow is increased. In addition, to further enhance the thermal stability of the parallel configuration, the present invention adjusts the design of various components, as detailed below.

Please refer to FIG. 3 and FIG. 4. The electrically insulating multilayer 30 has an upper insulating layer 31, a middle insulating layer 32, and a lower insulating layer 33. The upper insulating layer 31 extends beyond the first upper electrically conductive layer 12, by which the first upper electrically conductive layer 12 is entirely covered, and the first PTC layer 11 is partially covered. The middle insulating layer 32 is laminated between the first lower electrically conductive layer 13 and the second upper electrically conductive layer 22, thereby bonding the first temperature sensitive resistor 10 to the second temperature sensitive resistor 20. The lower insulating layer 33 extends beyond the second lower electrically conductive layer 23, by which the second lower electrically conductive layer 23 is entirely covered, and the second PTC layer 21 is partially covered. In an embodiment, the electrically insulating multilayer 30 may be a material selected from the group consisting of glass fiber reinforced epoxy resin composite, epoxy resin, polyester resin, polyamide resin, phenolic resin, polyurethane resin, polycyanate resin, maleimide resin, polyolefin resin, polyphenylene oxide resin, photopolymer resin, and combinations thereof. The coefficient of thermal expansion (CTE) of the material is lower than that of the PTC layers 11, 21. In addition, the middle insulating layer 32 may further mix inorganic functional micro- or nanoparticles in the material for the purpose of improvement of adhesive property, structural strength, or other physical properties.

More specifically, the upper insulating layer 31 is attached between and is physically in contact with the first electrode layer 41 and the first upper electrically conductive layer 12, so as to space the first electrode layer 41 apart from the first upper electrically conductive layer 12 by a distance D. The first electrode layer 41 and the first upper electrically conductive layer 12 are parallel to each other and extend along y-axis to the right notch 61, electrically connecting to each other through the right notch 61. In addition, an opening O is formed on the first electrode layer 41, and is positioned directly above (along z-axis) where the first PTC layer 11 is partially covered by the upper insulating layer 31, by which the first electrode layer 41 does not extend to the left notch 62 and has no electrical connection to the left notch 62. Moreover, there is not any metal layer extending from the left notch 62 to cover the upper insulating layer 31 on the horizontal plane (i.e., x-y plane) where the first electrode layer 41 is located. In other words, except for the first electrode layer 41, there is no other electrode layer existing on the same plane as the first electrode layer 41 at the other side of the circuit protection device 100 to cover the upper insulating layer 31. Therefore, there would be no likelihood that the first external electrode 51 may possibly contact the above-said other electrode layer and the possibility of short circuit is reduced even if the welding position of the first external electrode 51 shifts on x-y plane owing to alignment error. In an embodiment, the circuit protection device 100 further includes an electrically insulating material 70, such as solder mask or solder resist. The electrically insulating material 70 is filled in the opening O, so as to increase electrical insulation between the first electrode layer 41 and the left notch 62, and avoid improper welding because of poor weldability of the electrically insulating material 70. The lower insulating layer 33 is attached between and is physically in contact with the second electrode layer 42 and the second lower electrically conductive layer 23. Another opening O is also formed on the second electrode layer 42, and is positioned directly below where the first PTC layer 11 is partially covered by the lower insulating layer 33. The configuration of the opening O below the lower insulating layer 33 is the same as that of the above-said upper insulating layer 31, and is not described in detail herein.

In the present disclosure, the CTE of the upper insulating layer 31 is far different from that of the first PTC layer 11, that is, the CTE of the upper insulating layer 31 is lower than that of the first PTC layer 11. Therefore, the upper insulating layer 31 can suppress the first PTC layer 11 from excessive expansion, and increase the structural strength of the circuit protection device 100, by which the issue of poor resistance recovery incurred by thermal expansion can be solved. In addition, in this embodiment, the electrically conductive layer is divided into two parts (i.e., first upper electrically conductive layer 12 and first electrode layer 41), both connecting to the right notch 61 on the same side, thereby increasing the surface area of the conductor in a single temperature sensitive resistor 10. More specifically, because the first electrode layer 41 is separated from the first upper electrically conductive layer 12 by the upper insulating layer 31, the bottom surface of the first electrode layer 41 is not coplanar with the top surface of the first upper electrically conductive layer 12. As a result, this increases the surface area of the conductor and in the meanwhile, lowers electrical resistance of the temperature sensitive resistor 10. The lower insulating layer 33, the second lower electrically conductive layer 23, and the second electrode layer 42 are symmetric with and may have the same configuration as the upper insulating layer 31, the first upper electrically conductive layer 12, and the first electrode layer 41. Since the upper insulating layer 31 and the lower insulating layer 33 clamp two temperature sensitive resistors (i.e., first temperature sensitive resistor 10 and second temperature sensitive resistor 20) therebetween from top and bottom, the thermal expansion of the circuit protection device 100 can be suppressed, and the circuit protection device 100 can be prevented from deformation. Particularly, both the upper insulating layer 31 and the lower insulating layer 33 do not have a thick thickness, both of which would not occupy much space in the circuit protection device 100 and therefore the space occupation rate is low. For example, the distance D (see FIG. 4) may range from about 0.02 mm to 0.06 mm. In an embodiment, the distance D may be 0.02 mm, 0.03 mm, 0.04 mm, 0.05 mm, or 0.06 mm. In addition, the first electrode layer 41 has a fourth length L4, and the first upper electrically conductive layer 12 is has a fifth length L5 in the direction along y-axis. The fourth length L4 and the fifth length L5 are longer than a half of total length of the circuit protection device 100 along y-axis, facilitating in that the circuit protection device 100 has a desired low electrical resistance. Generally, considering there is a concern that the metal surface (e.g., the upper surface) of the first electrode layer 41 may have too large area exposed to the ambient environment, size of the first electrode layer 41 is preferably smaller than that of the first upper electrically conductive layer 12. That is, it is preferred that the fourth length L4 is shorter than the fifth length L5. In an embodiment, the first length L1 ranges from about 7 mm to 9 mm, such as 7 mm, 7.3 mm, 7.9 m, 8.2 mm, 8.7 mm, or 9 mm. Alternatively, the fourth length L4 may be longer than the fifth length L5. However, the fourth length L4 should be tightly controlled and the first electrode layer 41 would not be disposed so close to the left notch 62 that electrical arcing or even short-circuit might occur. In short, the upper insulating layer 31 and the lower insulating layer 33 occupy little space, and existence thereof may increase the surface area of the conductor and the structural strength of the circuit protection device 100.

Please refer to FIG. 3, the first electrode layer 41 and the second electrode layer 42 are attached to the upper insulating layer 31 and the lower insulating layer 33, respectively. The first electrode layer 41 is electrically connected to the first upper electrically conductive layer 12 and the second upper electrically conductive layer 22, and the second electrode layer 42 is electrically connected to the first lower electrically conductive layer 13 and the second lower electrically conductive layer 23. More specifically, the right notch 61 has a right electrically conductive member 63 electrically connecting to the first electrode layer 41, the first upper electrically conductive layer 12, and the second upper electrically conductive layer 22. The first electrode layer 41, the first upper electrically conductive layer 12, and the second upper electrically conductive layer 22 are electrically connected to each other through the right electrically conductive member 63. The left notch 62 has a left electrically conductive member 64 electrically connecting to the second electrode layer 42, the first lower electrically conductive layer 13, and the second lower electrically conductive layer 23. The second electrode layer 42, the first lower electrically conductive layer 13, and the second lower electrically conductive layer 23 are electrically connected to each other through the left electrically conductive member 64. It is noted that, as described above, the circuit protection device 100 may further include the structural reinforcing metal film 80. The structural reinforcing metal film 80 covers a surface of the first electrode layer 41, a surface of the second electrode layer 42, a surface of the right electrically conductive member 63, and a surface of the left electrically conductive member 64, by which the first electrode layer 41, the second electrode layer 42, the right electrically conductive member 63, and the left electrically conductive member 64 are insulated from environmental air. The coefficient of thermal expansion (CTE) of the structural reinforcing metal film 80 is much lower than that of the PTC layers 11, 21, and therefore the structural strength of the circuit protection device 100 is enhanced. In addition, the structural reinforcing metal film 80 is less prone to oxidation and has excellent conductivity, and it may cover the exposed portion of metal electrodes (i.e., first electrode layer 41 and second electrode layer 42) which are easily oxidized. Please refer to FIG. 2, the structural reinforcing metal film 80 covers the first electrode layer 41 so that a part of the upper surface 101 of the circuit protection device 100 is covered by the structural reinforcing metal film 80, and the remaining part of the upper surface 101 is covered by the electrically insulating material 70. On the right sidewall S1, the overall exposed surface of the right electrically conductive member 63 in the right notch 61 is covered by the structural reinforcing metal film 80. In addition, the structural reinforcing metal film 80 may have the same material as the solder, which is favorable to weldability of different components to be joined. For example, the structural reinforcing metal film 80 may be a metal film including tin. If the solder consists of tin alloy, weldability between the solder and the structural reinforcing metal film 80 is increased. The lower surface 102 and the left notch 62 may have the same design as the upper is surface 101 and the right notch 61, and are not described in detail herein.

Figure 2:
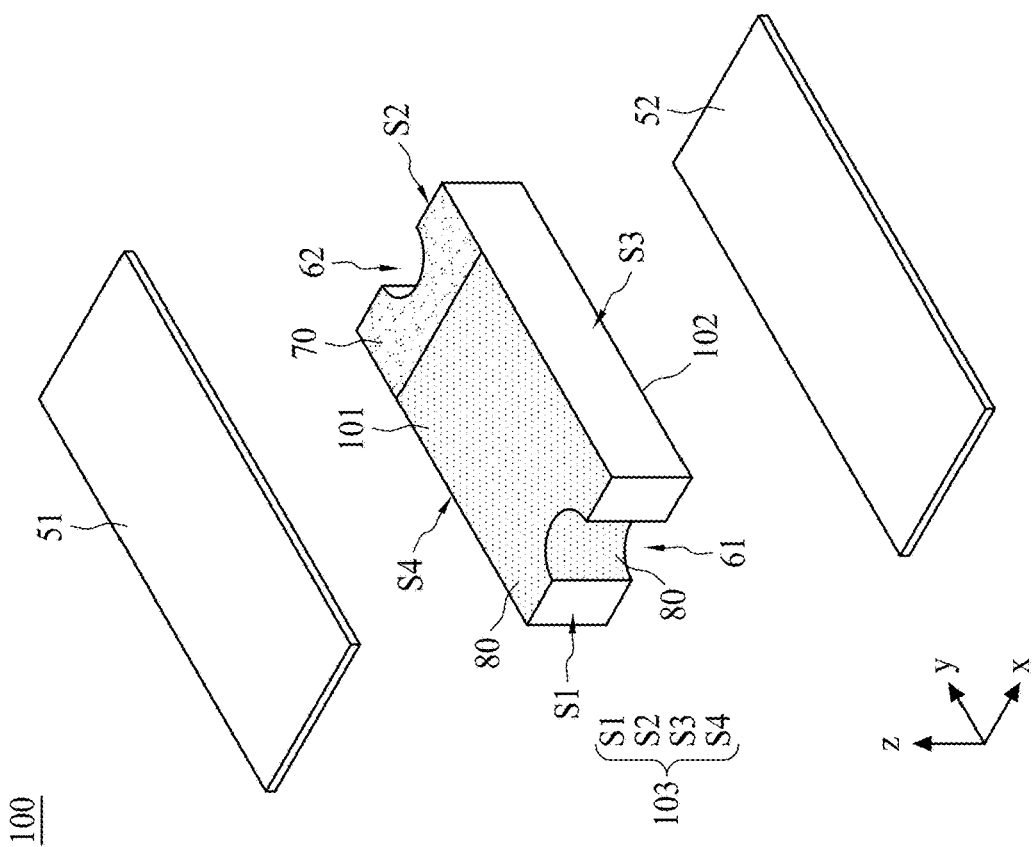
FIG. 2 shows an exploded view of the circuit protection device shown in FIG. 1.
Figure 5:
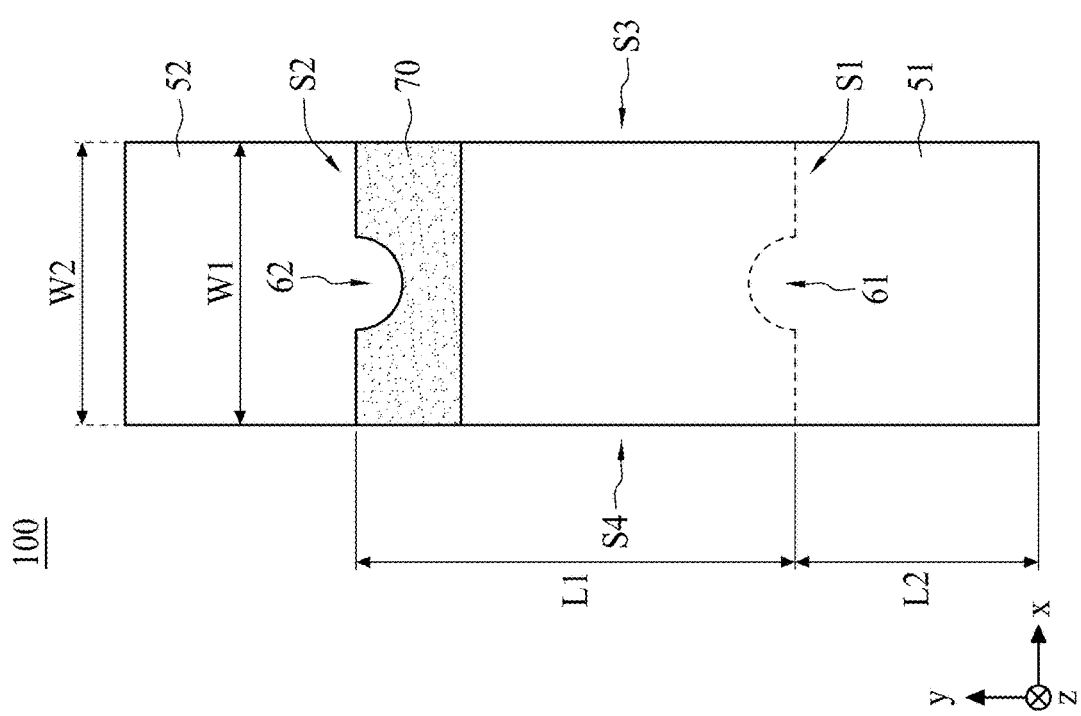
FIG. 5 shows a top view of the circuit protection device shown in FIG. 1.

Please refer to FIG. 5 and FIG. 2, in which the circuit protection device 100 is illustrated in top view. For ease of understanding, the discussion below mainly focuses on the first external electrode 51, and it is noted that the second external electrode 52 may have the same design as the first external electrode 51. The first external electrode 51 is disposed on the first electrode layer 41, and extends beyond the peripheral wall 103 along a first horizontal direction parallel to the first electrode layer 41. More specifically, the first external electrode 51 may extend in the first horizontal direction along y-axis and away from the left sidewall S2, and then extend beyond the right sidewall S1. Therefore, the right sidewall S1 and the right notch 61 thereon, illustrated as the dashed line shown in FIG. 5, are covered by the first external electrode 51. The first horizontal direction is substantially parallel to y-axis. The circuit protection device 100 has the first length L1 parallel to the first horizontal direction, and the first external electrode 51 has the second length L2 from and beyond the right sidewall S1 (also as shown in FIG. 2 and FIG. 3). If the sum of the first length L1 and the second length L2 is calculated as 100%, the second length L2 accounts for 31% to 53%. The second length L2 may be referred as "extending ratio" of the external electrode. In an embodiment, the extending ratio may be 31%, 33%, 36%, 38%, 42%, 46%, 47%, 49%, or 53%. For example, if the first length L1 is 8.2 mm and the second length L2 is 5 mm, the extending ratio would be calculated as about (5/(8.2+5))*100%=38%. In this way, heat dissipation is enhanced and hold current ($I_{hold}$) of the circuit protection device 100 may also be increased due to additional extension of the length of external electrode that increases the surface area of the first external electrode 51 to be exposed to the environment. The improvement may be applied to different sizes of the circuit protection device, as long as the extension of the second length L2 is adjusted in a suitable range. If the extending ratio is lower than 31%, the first external electrode 51 is too short to be welded to an external device. If the extending ratio is higher than 53%, the first external electrode 51 is easily bent and prone to deformation due to its excessive length. Also, entire size of the circuit protection device 100 is unnecessarily increased and such larger device occupies much space if the extending ratio is higher than 53%. In a preferred embodiment, the extending ratio is higher than 47%, such as in a range from 47% to 53%, in order to increase the quality of welding (e.g., spot welding) and heat dissipation. As for the material of the external electrode, the first external electrode 51 and the second external electrode 52 may be copper strips, nickel strips, or steel strips. Shape of the nickel strip is easily influenced by heat, and thus the nickel strip is suitable for spot welding rather than reflow welding. Structural strength of the copper strip is better than that of the nickel strip, and thus the copper strip is suitable for reflow welding.

In FIG. 5, the circuit protection device 100 further has a first width W1, and each of the first external electrode 51 and the second external electrode 52 has a second width W2. In an embodiment, the first width W1 ranges from 4 mm to 6 mm, such as 4 mm, 4.3 mm, 4.5 mm, 5.3 mm, 5.7 mm, or 6 mm. For ease of assembly, the second width W2 is preferably equal to or narrower than the first width W. The extension length of the first external electrode 51 (i.e., the second length L2) is helpful in heat dissipation as described above. In addition, the surface area on top of the first external electrode 51 can also be adjusted. More specifically, the first length L1 times the first width W1 is equal to the surface area of the upper surface 101 of the circuit protection device 100 (referred to as "first upper surface area" hereinafter), and the third length L3 (as shown in FIG. 3) times the second width W2 is equal to the surface area of the upper surface of the first external electrode 51 (referred to as "second upper surface area" hereinafter). In an embodiment, the third length L3 ranges from about 9.25 mm to 12.25 mm, such as 9.25 mm, 10.25 mm, 11.25 mm, or 12.25 mm. For further improvement in heat dissipation, the second upper surface area of the first external electrode 51 is adjusted, and a value by dividing the second upper surface area by the first upper surface area ranges from 1.37 to 1.64. For example, the circuit protection device 100 has the first length L1 with 8.2 mm, and the first width W1 with 5.3 mm; and for further improvement in heat dissipation, the third length L3 can be set up to 12.25 mm, and the second width W2 is 5.3 mm which is equal to the first width W1. Accordingly, the second upper surface area and the first upper surface area can be calculated, and are about 64.93 mm$^2$ and 43.46 mm$^2$, respectively, and the ratio therebetween is about 1.49. In this way, the second upper surface area of the first external electrode 51 is larger than the first upper surface area of the circuit protection device 100, and the ratio therebetween is in the range from 1.37 to 1.64, by which the first external electrode 51 is helpful in heat dissipation and hold current ($I_{hold}$) of the circuit protection device 100 is increased. Moreover, in another embodiment, the first external electrode 51 having the second upper surface area of 64.93 mm$^2$ can be installed away from the right sidewall S1, which makes the second length L2 equal to 8 mm and has the best extending ratio. In other words, the present disclosure not only adjusts the second upper surface area of the first external electrode 51, but also installs the first external electrode 51 in the direction away from the peripheral wall 103. Even if the first external electrode 51 is covered by an insulation material in the subsequent packaging process, a portion of the upper surface of the first external electrode 51 still remains uncovered and exposed to the environment, thereby effectively enhancing heat dissipation and increasing hold current ($I_{hold}$) of the circuit protection device 100. In an embodiment, there are circuit protection devices 100 in different sizes, and hence the ratio between the second upper surface area and the first upper surface area may be 1.37, 1.43, 1.49, 1.55, 1.58, 1.61, 1.64. In a preferred embodiment, the value by dividing the second upper surface area by the first upper surface area ranges from 1.49 to 1.64, and the circuit protection device 100 has larger hold current ($I_{hold}$).

Figure 6:
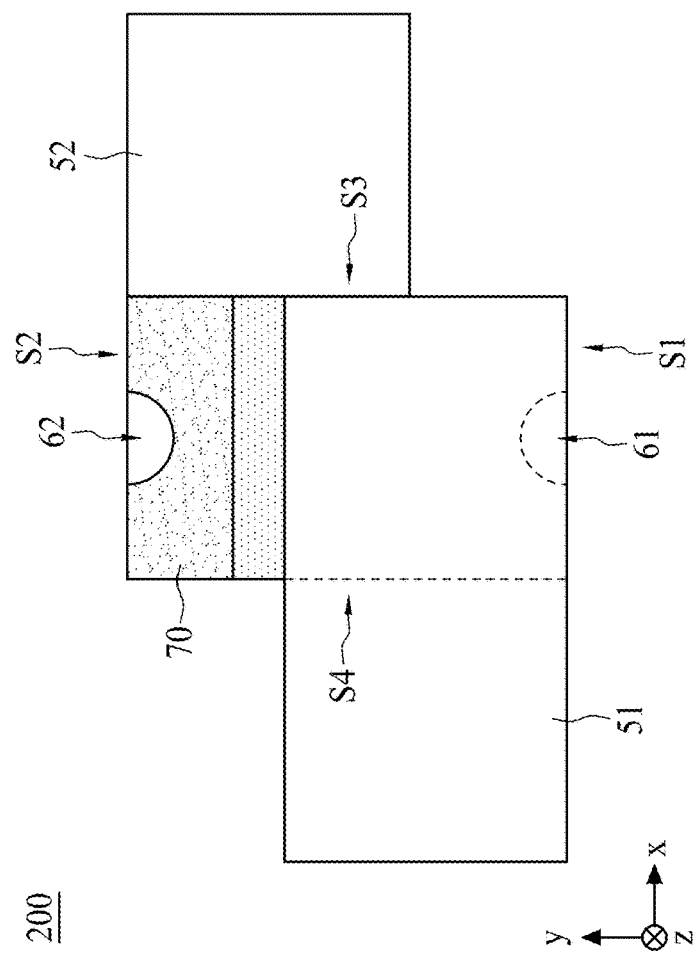
FIG. 6 shows a top view of a circuit protection device in accordance with a second aspect of the present invention.

Please refer to FIG. 6, in which a circuit protection device 200 is illustrated in accordance with a second aspect of the present invention. Compared with FIG. 5, extension direction of the first external electrode 51 and the second external electrode 52 in FIG. 6 is different. In FIG. 5, the first external electrode 51 of the circuit protection device 100 extends beyond the right sidewall S1 along the first horizontal direction, and is disposed on the first electrode layer 41 covered by the structural reinforcing metal film 80. The second external electrode 52 extends opposite to the first horizontal direction and beyond the left sidewall S2, and is disposed on the second electrode layer 42 covered by the structural reinforcing metal film 80. In contrast, in FIG. 6, the first external electrode 51 of the circuit protection device 200 extends along a second horizontal direction parallel to the first electrode layer 41 and beyond the front sidewall S4. The second external electrode 52 extends parallel to the first external electrode 51 and beyond the rear sidewall S3. That is, the first external electrode 51 and the second external electrode 52 extend outward, and are perpendicular to the long side of the circuit protection device 200. The first horizontal direction is substantially parallel to y-axis, and the second horizontal direction is substantially parallel to x-axis; and hence on x-y plane, the first horizontal direction is substantially perpendicular to the second horizontal direction. Accordingly, the first external electrode 51 and the second external electrode 52 may vary in configuration depending on the requirements.

Figure 7:
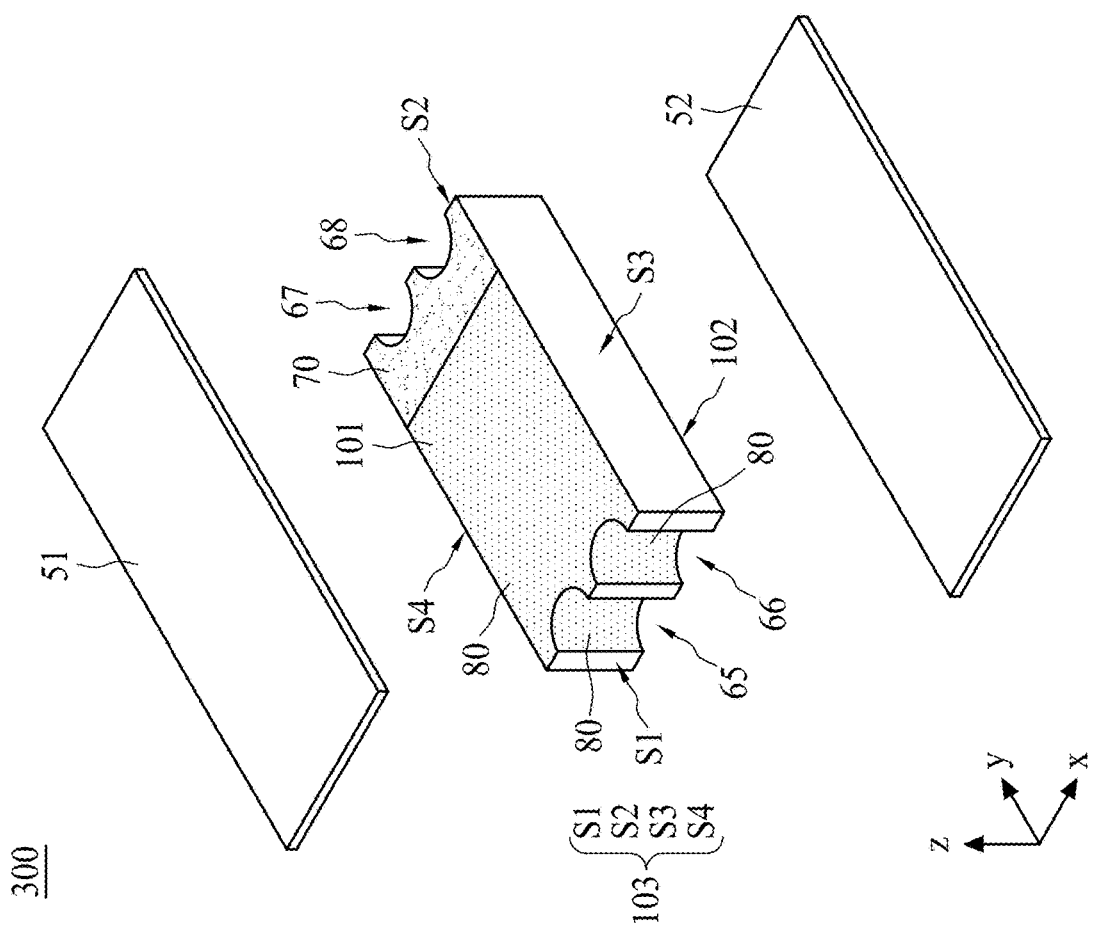
FIG. 7 shows an exploded view of a circuit protection device in accordance with a third aspect of the present invention.

Please refer to FIG. 7, in which a circuit protection device 300 is illustrated in accordance with a third aspect of the present invention. In FIG. 7, the same features as shown in the first aspect are indicated by the same numerals, and are not described in detail herein. Compared with FIG. 2, FIG. 7 shows a circuit protection device 300 having different number and position of notches. More specifically, the circuit protection device 300 further includes a plurality of right notches (e.g., a first right notch 65 and a second right notch 66) and a plurality of left notches (e.g., a first left notch 67 and a second left notch 68) opposite to the plurality of right notches. The plurality of right notches are disposed on the right sidewall S1 and the plurality of left notches are disposed on the left sidewall S2 of the peripheral wall 103, respectively. Adding number of notches on one side can mitigate stresses caused by thermal expansion, and therefore, no crack would be produced on the circuit protection device 300 during use of device. Furthermore, the mitigation and distribution of stresses would be more obvious if the notches are symmetric on both sides (i.e., the right sidewall S1 to the left sidewall S2). In an embodiment, the first right notch 65 and the second right notch 66 are recesses in a shape of half-cylinder, and both of them may have the same radius in top view. In another embodiment, the present disclosure designs the notches in a more symmetric manner, and therefore the first right notch 65 and the second right notch 66 are symmetric on the right sidewall S1. That is, the right sidewall S1 is equally divided into three rectangular sidewalls, all of which have the same surface area. The same configuration may be applied to the left sidewall S2. Moreover, the first external electrode 51 may extend beyond the right sidewall S1 along the first horizontal direction, and is disposed on the first electrode layer 41 covered by the structural reinforcing metal film 80. The second external electrode 52 may extend opposite to the first horizontal direction and beyond the left sidewall S2, and is disposed on the second electrode layer 42 covered by the structural reinforcing metal film 80. In another embodiment, the first external electrode 51 may extend along the second horizontal direction and beyond the front sidewall S4, and the second external electrode 52 may extend parallel to the first external electrode 51 and beyond the rear sidewall S3. In other words, orientation between the first external electrode 51 and the second external electrode 52 may be the same as that in either FIG. 5 or FIG. 6.

Figure 8:
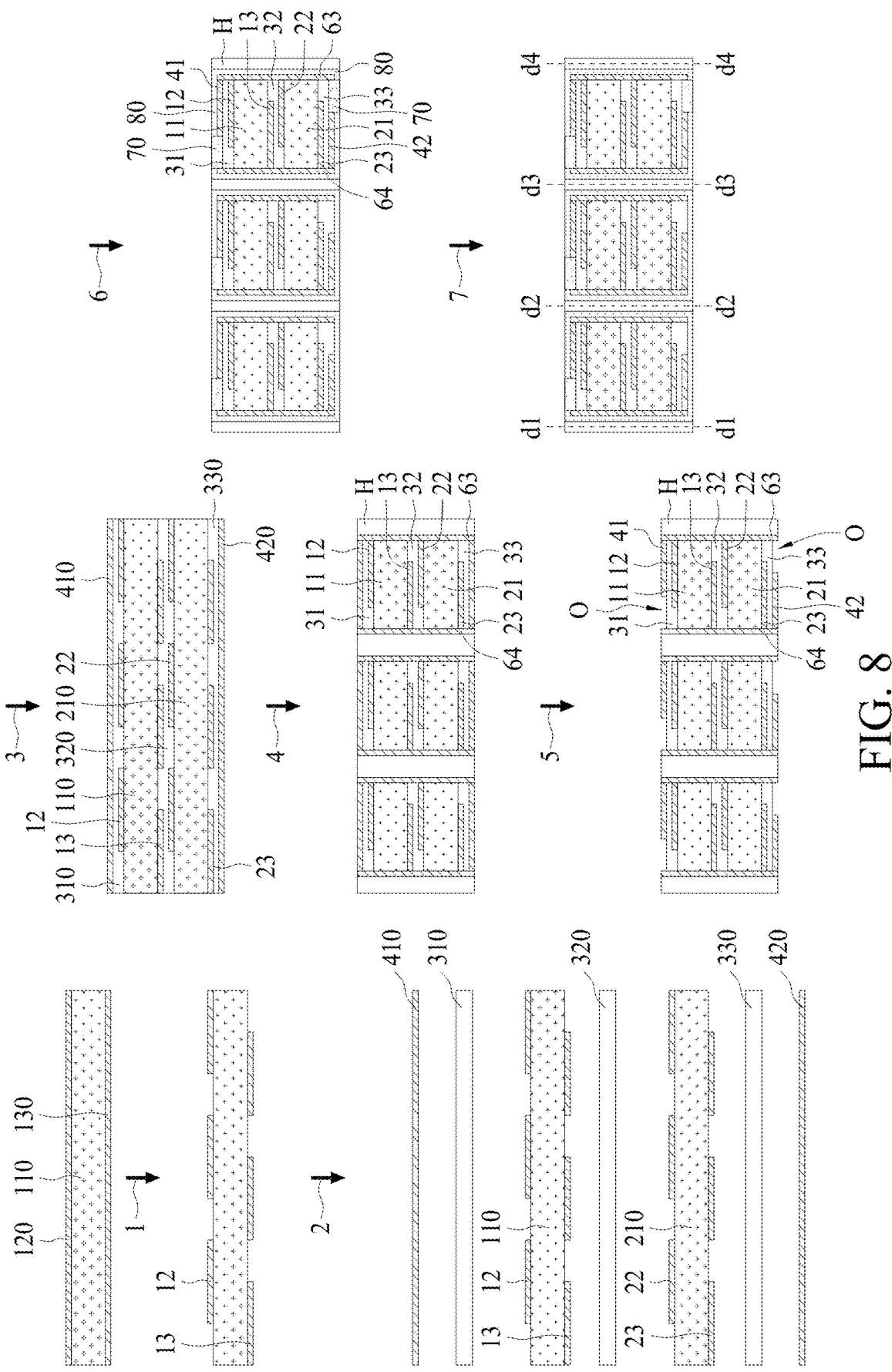
FIG. 8 shows a flow chart for manufacturing the circuit protection device in accordance with the present invention.

Please further refer to FIG. 8, in which a manufacturing process of the circuit protection device 100 (shown in FIG.

1) is illustrated for ease of understanding the present disclosure. The manufacturing process generally includes step 1 to step 7. Details are described below.

Step 1: A first upper electrically conductive plate 120, a first lower electrically conductive plate 130, and a first positive temperature coefficient plate 110 are provided. The first positive temperature coefficient plate 110 is laminated between the first upper electrically conductive plate 120 and the first lower electrically conductive plate 130 by performing a hot-pressing process. Then, the first upper electrically conductive plate 120 and the first lower electrically conductive plate 130 are etched to expose the first positive is temperature coefficient plate 110, and to form a plurality of first upper electrically conductive layers 12 and a plurality of first lower electrically conductive layers 13.

Step 2: The step 1 is repeated again, and a second positive temperature coefficient plate 210, a plurality of second upper electrically conductive layers 22, and a plurality of second lower electrically conductive layers 23 are obtained. Next, a first electrode plate 410 and an upper insulating plate 310 are sequentially stacked on the plurality of first upper electrically conductive layers 12; a middle insulating plate 320 is positioned between the plurality of first lower electrically conductive layers 13 and the plurality of first upper electrically conductive layers 12; and a lower insulating plate 330 and a second electrode plate 420 are sequentially stacked below the plurality of second lower electrically conductive layers 23.

Step 3: The aforementioned layers are stacked in an order like that in the step 2, and are hot-pressed accordingly. Therefore, a laminated structure having two positive temperature coefficient plates is obtained.

Step 4: The laminated structure in the step 3 is drilled to form a plurality of electrically conductive vias H. The drilling method may be mechanical drilling, laser drilling, or other drilling techniques. After drilling, a plating process is performed on the plurality of electrically conductive vias H. The plurality of electrically conductive vias H is not limited to plating through holes (PTH). As long as electrical connection can be made, PTH could be replaced with electrical pins or other similar structures instead. Accordingly, a plurality of right electrically conductive members 63 and a plurality of left electrically conductive members 64 are formed in the plurality of electrically conductive vias H. In the meantime, a plurality of upper insulating layers 31, a plurality of first positive temperature coefficient layers 11, a plurality of middle insulating layers 32, a plurality of first positive temperature coefficient layers 21, and a plurality of lower insulating layers 33 are formed between the plurality of electrically conductive vias H.

Step 5: After drilling in the step 4, the first electrode plate 410 and the second electrode plate 420 are etched to form a plurality of openings O, thereby exposing the plurality of upper insulating layers 31 and the plurality of lower insulating layers 3, and forming a plurality of first electrode layers 41 and a plurality of second electrode layers 42 thereon, respectively.

Step 6: In order to increase structural strength of the circuit protection device 100 and prevent the metal electrodes from oxidation, surfaces of the plurality of first electrode layers 41, the plurality of second electrode layers 42, the plurality of right electrically conductive members 63, and the plurality of left electrically conductive members 64 are covered by a structural reinforcing metal film 80. In an embodiment, the structural reinforcing metal film 80 may be a tin-containing film, and surfaces of the plurality of first electrode layers 41, the plurality of second electrode layers 42, the plurality of right electrically conductive members 63, and the plurality of left electrically conductive members 64 may be coated by the tin-containing film through a sputtering or an electroplating process.

Step 7: The structure in the step 6 is diced along a dicing line d1-d1, a dicing line d2-d2, a dicing line d3-d3, and a dicing line d4-d4. Therefore, at least three circuit protection devices are produced as shown in the figure.

In addition to the foregoing steps, a packaging process may by further performed for the purpose of enhancement of insulation and structural stability of the device. Therefore, the circuit protection device may have a packaging structure as shown in FIG. 9 to FIG. 11.

Figure 10:
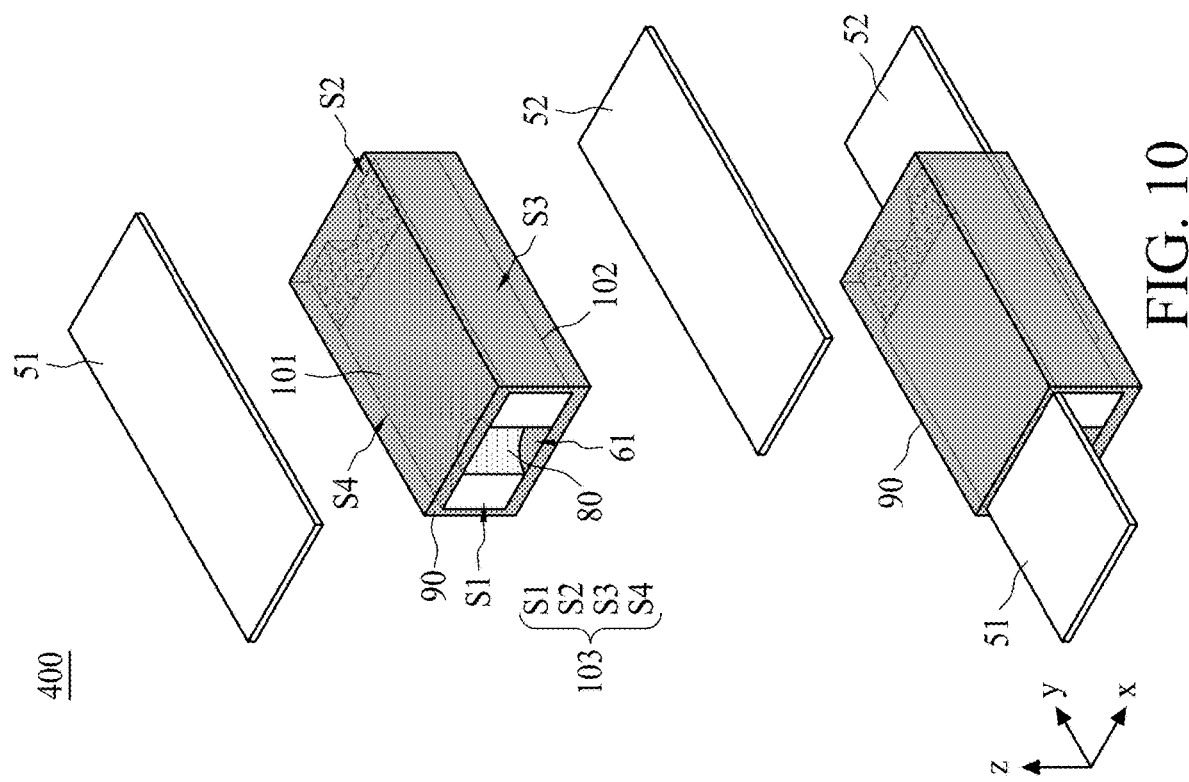
FIG. 10 shows a three-dimensional view and an exploded view of a circuit protection device in accordance with a fourth aspect of the present invention.
Figure 9:
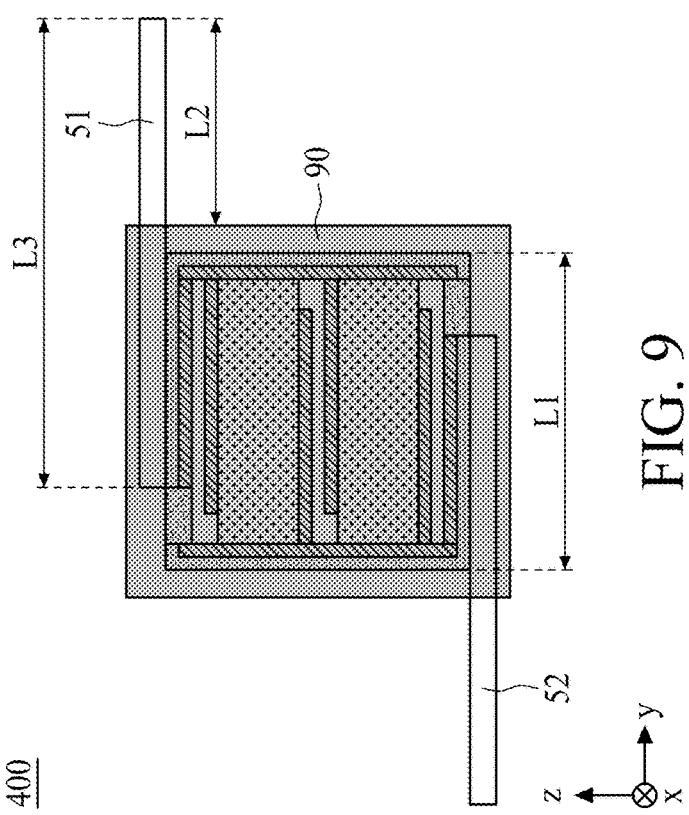
FIG. 9 shows a cross-sectional view of a circuit protection device in accordance with a fourth aspect of the present invention.

FIG. 9 and FIG. 10 show a circuit protection device 400 in accordance with a fourth aspect of the present invention. In FIG. 9, the circuit protection device 400 further includes a packaging tape 90. The packaging tape 90 may be a film-like tape made of polymers and has adhesive property. For example, the packaging tape 90 may be made from a polymer matrix and an adhesive. The polymer matrix may be polyester film, and the adhesive may be silicon gel. In FIG. 10, it is shown that the packaging tape 90 wraps around and is is adhered to the circuit protection device 400 so as to cover the upper surface 101, the front sidewall S4, the lower surface 102, and the rear sidewall S3, by which only the right sidewall S1, the left sidewall S2, a part of the first external electrode 51, and a part of the second external electrode 52 of the circuit protection device 400 are exposed. It is noted that, for ease of understanding, the upper figure in FIG. 10 shows a partially exploded view of the circuit protection device 400, in which the first external electrode 51 and the second external electrode 52 are detached from the circuit protection device 400. As can be seen, the packaging tape 90 does not cover the right sidewall S1 and the left sidewall S2. The packaging tape 90 has two sides which may extend beyond the right sidewall S1 and the left sidewall S2 along y-axis, or may be flush with the right sidewall S1 and the left sidewall S2. According to the present invention, in case that right and left sides of the packaging tape 90 extend beyond the peripheral wall 103, the second length L2 is calculated from the packaging tape 90 along y-axis, as shown in FIG. 9. Because the circuit protection device 400 is enclosed by the packaging tape 90, the circuit protection device 400 may have better insulation and structural stability. Moreover, the packaging tape 90 may be either transparent or non-transparent. In the case that the packaging tape 90 is transparent, such a transparent packaging tape 90 would be helpful in defect inspection. Any person may employ his naked eyes or an optical device could be used to check whether there are defects existing in the circuit protection device 400 even though covered by the packaging tape 90. In this way, transparency of the packaging tape 90 is favorable to quality control and increase of yield rate of production. It is understood that features of the fourth aspect (except the packaging tape 90) may be the same as that of the first aspect, the second aspect, and the third aspect, and are not described in detail herein.

Figure 11:
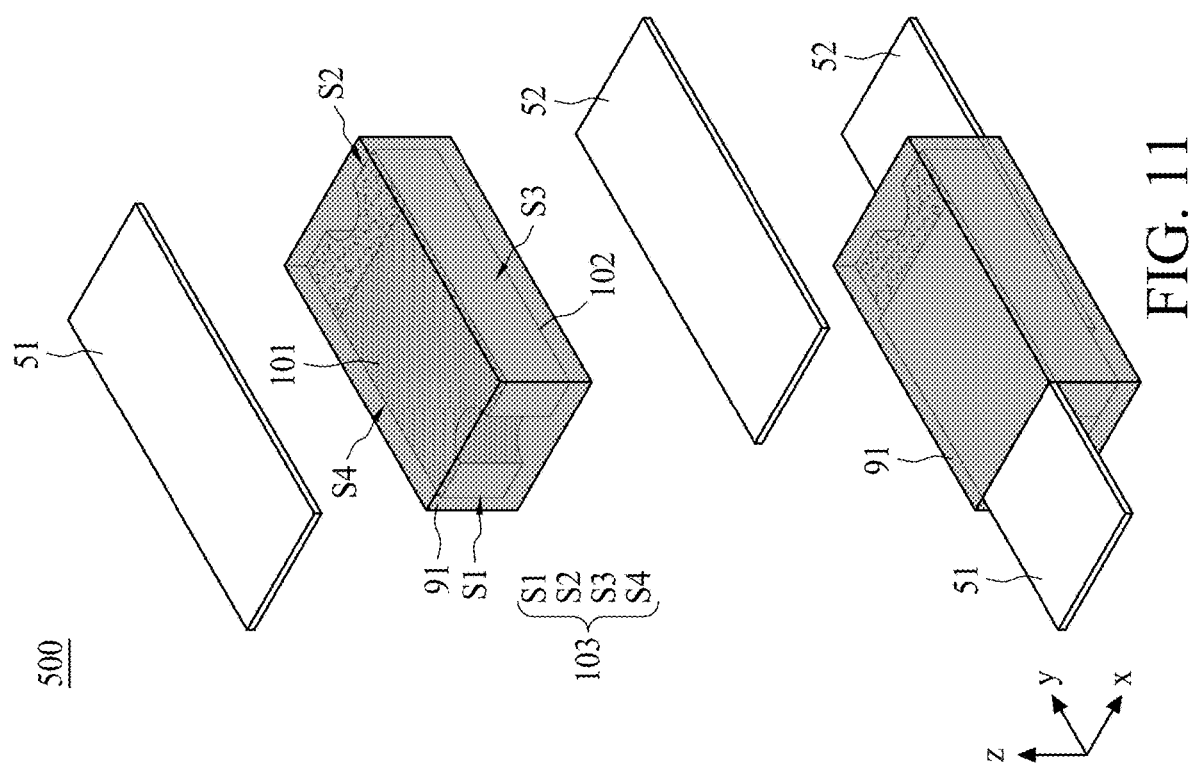
FIG. 11 shows a three-dimensional view and an exploded view of a circuit protection device in accordance with a fifth aspect of the present invention.

FIG. 11 shows a circuit protection device 500 in accordance with a fifth aspect of the present invention. Compared with FIG. 10, the circuit protection device 500 in FIG. 11 is packaged by an electrically insulating is frame 91 rather than the packaging tape 90. The electrically insulating frame 91 may be a cured thermosetting polymer. More specifically, the circuit protection device 500 may be coated by a flowable thermosetting polymer through injection molding or other packaging processes, and then the flowable thermosetting polymer is cured thereon. Therefore, the electrically insulating frame 91 encapsulates the circuit protection device 500, and only exposes a part of the first external electrode 51 and a part of the second external electrode 52. It is understood that features of the fifth aspect (except the electrically insulating frame 91) may be the same as that of the first aspect, the second aspect, the third aspect, and the fourth aspect, and are not described in detail herein.

To sum up, according to the present invention, a structural reinforcing metal film 80 is coated on the surface of the circuit protection device 100, and the circuit protection device 100 includes an upper insulating layer 31 and a lower insulating layer 33, therefore structural strength of the device can be increased, and the issue of poor resistance recovery incurred by thermal expansion can be solved. Moreover, the present invention also makes changes for the external electrodes 51, 52, including their surface area, their position to be placed, and their length to be extended, therefore heat dissipation efficiency of the circuit protection device can be enhanced and hold current ($I_{hold}$) of the circuit protection device is also increased. Accordingly, the circuit protection device can be applied to electronic apparatuses which need higher rated current. In addition, the present invention forms at least one right notch 65, 66 and at least one left notch 67, 68 on both sides of the circuit protection device 300, by which stresses of thermal expansion are mitigated, and the device deformation is prevented such that the issue of poor resistance recovery can also be avoided. Furthermore, because the present invention uses packaging tape 90 or electrically insulating frame 91 to encapsulate the circuit protection device, environment factors can be blocked from contacting the circuit protection device and the entire structure of the circuit protection device may be further stabilized.

The above-described embodiments of the present invention are intended to be illustrative only. Numerous alternative embodiments may be devised by persons skilled in the art without departing from the scope of the following claims.

What is claimed is:

1. A circuit protection device having an upper surface, a lower surface opposite to the upper surface, and a peripheral wall connected between the upper surface and the lower surface, the circuit protection device comprising:
   a first temperature sensitive resistor comprising a first upper electrically conductive layer, a first lower electrically conductive layer, and a first positive temperature coefficient (PTC) layer laminated between the first upper electrically conductive layer and the first lower electrically conductive layer;
   a second temperature sensitive resistor comprising a second upper electrically conductive layer, a second lower electrically conductive layer, and a second PTC layer laminated between the second upper electrically conductive layer and the second lower electrically conductive layer;
   an electrically insulating multilayer having an upper insulating layer, a middle insulating layer, and a lower insulating layer, wherein:
      the upper insulating layer extends beyond the first upper electrically conductive layer, whereby the first upper electrically conductive layer is entirely covered and the first PTC layer is partially covered by the upper insulating layer;
      the middle insulating layer is laminated between the first lower electrically conductive layer and the second upper electrically conductive layer, thereby bonding the first temperature sensitive resistor to the second temperature sensitive resistor; and
      the lower insulating layer extends beyond the second lower electrically conductive layer, whereby the second lower electrically conductive layer is entirely covered and the second PTC layer is partially covered by the lower insulating layer;
   a right notch and a left notch, wherein the upper insulating layer is attached between the first electrode layer and the first upper electrically conductive layer, so as to space the first electrode layer apart from the first upper electrically conductive layer by a distance, and wherein the first electrode layer and the first upper electrically conductive layer are parallel to each other, and extend to the right notch, thereby electrically connecting to each other through the right notch;
   a first electrode layer and a second electrode layer attached to the upper insulating layer and the lower insulating layer, respectively, wherein the first electrode layer is electrically connected to the first upper electrically conductive layer and the second upper electrically conductive layer, and the second electrode layer is electrically connected to the first lower electrically conductive layer and the second lower electrically conductive layer; and
   a first external electrode disposed on the first electrode layer, wherein the first external electrode extends beyond the peripheral wall along a first horizontal direction parallel to the first electrode layer.

2. The circuit protection device of claim 1, wherein the distance ranges from 0.02 mm to 0.06 mm.

3. The circuit protection device of claim 1, wherein an opening is formed on the first electrode layer, and is positioned directly above where the first PTC layer is partially covered by the upper insulating layer, whereby the first electrode layer does not extend to the left notch and has no electrical connection to the left notch.

4. The circuit protection device of claim 3, further comprising an electrically insulating material, wherein the electrically insulating material is filled in the opening.

5. The circuit protection device of claim 3, wherein the right notch has a right electrically conductive member electrically connecting to the first electrode layer, the first upper electrically conductive layer, and the second upper electrically conductive layer, and wherein the left notch has a left electrically conductive member electrically connecting to the second electrode layer, the first lower electrically conductive layer, and the second lower electrically conductive layer.

6. The circuit protection device of claim 5, further comprising a structural reinforcing metal film, wherein the structural reinforcing metal film covers a surface of the first electrode layer, a surface of the second electrode layer, a surface of the right electrically conductive member, and a surface of the left electrically conductive member, whereby the first electrode layer, the second electrode layer, the right electrically conductive member, and the left electrically conductive member are insulated from environmental air.

7. The circuit protection device of claim 6, wherein the peripheral wall has a left sidewall, a right sidewall opposite to the left sidewall, a front sidewall, and a rear sidewall opposite to the front sidewall, wherein the left notch is disposed on the left sidewall, and the right notch is disposed on the right sidewall.

8. The circuit protection device of claim 7, wherein the first external electrode extends beyond the right sidewall along the first horizontal direction.

9. The circuit protection device of claim 8, wherein the circuit protection device has a first length parallel to the first horizontal direction, and the first external electrode has a second length from and beyond the right sidewall, wherein if the sum of the first length and the second length is calculated as 100%, the second length accounts for 31% to 53%.

10. The circuit protection device of claim 9, wherein the second length ranges from 4 mm to 8 mm.

11. The circuit protection device of claim 10, wherein the upper surface of the circuit protection device has a first upper surface area, an upper surface of the first external electrode has a second upper surface area, and a value by dividing the second upper surface area by the first upper surface area ranges from 1.37 to 1.64.

12. The circuit protection device of claim 8, further comprising a second external electrode disposed on the second electrode layer covered by the structural reinforcing metal film, wherein the first external electrode extends along a second horizontal direction parallel to the first electrode layer and beyond the front sidewall, and the second external electrode extends parallel to the first external electrode and beyond the rear sidewall.

13. The circuit protection device of claim 8, further comprising a second external electrode disposed on the second electrode layer covered by the structural reinforcing metal film, wherein the second external electrode extends opposite to the first horizontal direction and beyond the left sidewall.

14. The circuit protection device of claim 13, further comprising a packaging tape, wherein the packaging tape wraps around the circuit protection device so as to cover the upper surface, the front sidewall, the lower surface, and the rear sidewall, whereby only the right sidewall, the left sidewall, a part of the first external electrode, and a part of the second external electrode of the circuit protection device are exposed.

15. The circuit protection device of claim 13, further comprising an electrically insulating frame, wherein the electrically insulating frame encapsulates the circuit protection device, and only exposes a part of the first external electrode and a part of the second external electrode.

16. The circuit protection device of claim 1, further comprising a plurality of right notches and a plurality of left notches opposite to the plurality of right notches, wherein the plurality of right notches are disposed on a right sidewall and the plurality of left notches are disposed on a left sidewall of the peripheral wall, respectively, and the first external electrode extends beyond the right sidewall along the first horizontal direction.

17. The circuit protection device of claim 16, further comprising a second external electrode disposed on the second electrode layer, wherein the second external electrode extends opposite to the first horizontal direction parallel to the second electrode layer, and extends beyond the left sidewall.

18. The circuit protection device of claim 17, further comprising a packaging tape, wherein the packaging tape wraps around the circuit protection device, whereby only the right sidewall, the left sidewall, a part of the first external electrode, and a part of the second external electrode of the circuit protection device are exposed.

19. The circuit protection device of claim 17, further comprising an electrically insulating frame, wherein the electrically insulating frame encapsulates the circuit protection device, and only exposes a part of the first external electrode and a part of the second external electrode.

* * * * *